United States Patent
Dudar

(10) Patent No.: US 9,550,486 B2
(45) Date of Patent: Jan. 24, 2017

(54) SYSTEMS AND METHODS FOR DETECTING A STUCK BRAKE FRICTION COMPONENT

(71) Applicant: FORD GLOBAL TECHNOLOGIES, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 55 days.

(21) Appl. No.: 14/718,362

(22) Filed: May 21, 2015

(65) Prior Publication Data

US 2016/0339896 A1  Nov. 24, 2016

(51) Int. Cl.
*B60T 17/22* (2006.01)

(52) U.S. Cl.
CPC .................... *B60T 17/221* (2013.01)

(58) Field of Classification Search
None
See application file for complete search history.

(56) References Cited

U.S. PATENT DOCUMENTS

| 8,026,802 | B2 | 9/2011 | Shimura |
| 8,319,623 | B2 | 11/2012 | Wallace et al. |
| 8,332,114 | B2* | 12/2012 | Whittingham ........ B60T 8/1703 244/111 |
| 8,717,159 | B2 | 5/2014 | Todd et al. |
| 2002/0195298 | A1 | 12/2002 | Borugian |
| 2006/0267750 | A1 | 11/2006 | Lu et al. |
| 2014/0277928 | A1 | 9/2014 | Wallace et al. |

* cited by examiner

*Primary Examiner* — Redhwan K Mawari
*Assistant Examiner* — Edward Torchinsky
(74) *Attorney, Agent, or Firm* — Jones Robb, PLLC; Raymond L. Coppiellie

(57) ABSTRACT

A system for detecting a stuck brake friction component of a motor vehicle may include a tire pressure monitoring system and a steering wheel angle sensor. The system may also include a controller configured to receive signals from the tire pressure monitoring system and the steering wheel angle sensor and to generate a notification if the signals indicate that one or more of the friction components of the vehicle's braking system is stuck in an engaged position.

24 Claims, 5 Drawing Sheets

SYSTEMS AND METHODS FOR DETECTING A STUCK BRAKE FRICTION COMPONENT

TECHNICAL FIELD

The present disclosure relates generally to systems and methods for detecting a stuck brake friction component. In particular, the present disclosure relates to systems and methods for detecting a stuck brake caliper or brake shoe in a motor vehicle.

BACKGROUND

Motor vehicle braking systems utilize various types of friction components, such as, for example, brake calipers and shoes, to slow and/or stop the vehicle by converting kinetic energy into heat energy (i.e., via friction). Brake calipers, for example, are components within a vehicle's disc-braking system that engage and disengage brake rotors to slow and/or stop the vehicle's motion. In a disc-braking system, for example, each wheel (i.e., tire) of the vehicle is attached to a metal disc, or rotor, that is configured to spin with the wheel. Each wheel also has a caliper that is configured to fit over the rotor like a clamp to position a brake pad on either side of the rotor. In this manner, the caliper may engage the rotor to create friction between the brake pads and the rotor to stop and/or slow the wheel.

If one of the calipers becomes stuck against the rotor (i.e., remains in an engaged position with the rotor), it may, however, cause various undesirable issues. For example, due to the constant friction forces between the stuck caliper (i.e., the brake pads of the caliper) and the rotor, the brake pads may wear out prematurely; the rotor, rim, and tire may overheat and produce a bad smell; and/or the vehicle may tend to pull to one side thereby requiring the driver to self-correct to make the vehicle go straight. It is, however, generally not easy for a driver to recognize a stuck brake caliper until the brake pads are worn excessively and require replacement.

It may, therefore, be advantageous for a vehicle to include a system that can detect a stuck brake friction component, such as, for example, a caliper, and notify the driver of the vehicle regarding the same. It may be further advantageous to provide a system that utilizes existing vehicle sensors to detect stuck brake friction components.

SUMMARY

In accordance with various exemplary embodiments, a system for detecting a stuck brake friction component of a motor vehicle may include a tire pressure monitoring system and a steering wheel angle sensor. The system may also include a controller configured to receive signals from the tire pressure monitoring system and the steering wheel angle sensor and to generate a notification if the signals indicate that one or more of the friction components of the vehicle's braking system is stuck in an engaged position.

In accordance with various additional exemplary embodiments, a method for detecting stuck brake friction component of a motor vehicle may include receiving signals corresponding to a current tire pressure of at least one tire of the vehicle and an angle of a steering wheel of the vehicle. The method may also include calculating a pressure change of the at least one tire and comparing the pressure change of the at least one tire with a threshold pressure change. The method may also include flagging a tire if the pressure change of the tire is greater than the threshold pressure change. The method may further include generating a notification if the angle of the steering wheel exceeds a threshold value for one or more of the flagged tires.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
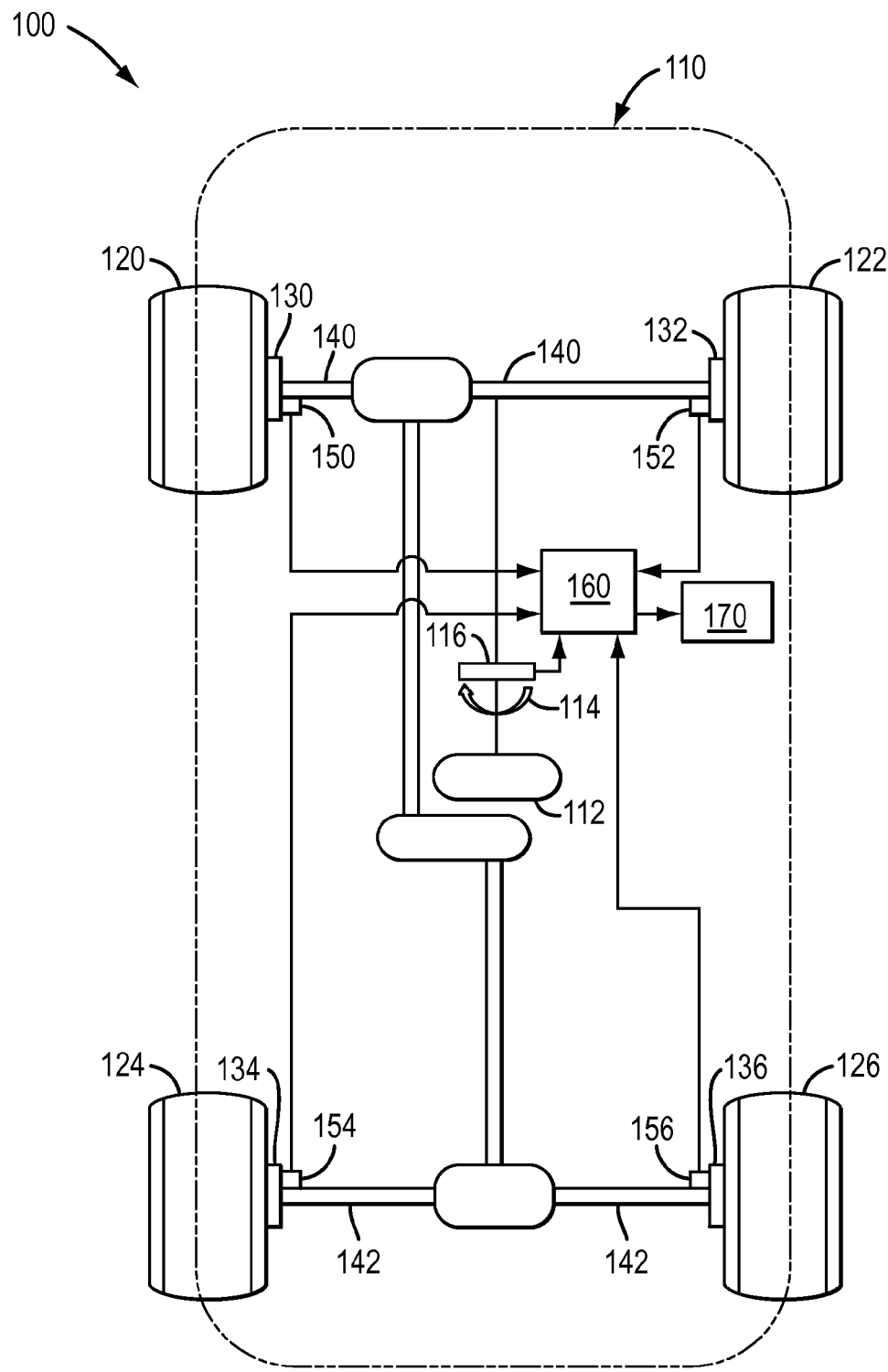
FIG. 1 is a schematic diagram showing the structure of an exemplary embodiment of a system for detecting a stuck brake friction component of a motor vehicle in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

If one or more of the friction components (e.g. brake calipers or shoes) in a vehicle's braking system becomes stuck in an engaged position (e.g., with a rotor or drum of the braking system), it may cause various undesirable issues that affect both the performance and safety of the vehicle. It is, however, generally not easy for a driver to recognize a stuck brake friction component until the component is worn excessively and requires replacement.

To alert a driver that one or more of the brake friction components is stuck in an engaged position and may therefore require service, the systems and methods of the present disclosure contemplate receiving signals from a tire pressure monitoring system and a steering wheel angle sensor and generating a notification based on the signals.

In accordance with various exemplary embodiments, a system for detecting a stuck brake friction component may include a controller configured to receive signals corresponding to a current tire pressure of each tire of the vehicle from the tire pressure monitoring system and an angle of a steering wheel of the vehicle from the steering wheel angle sensor. The controller may then generate the notification if the signals indicate that one or more of the friction components of the vehicle's braking system is stuck in an engaged position. In various embodiments, for example, the system may further include a notification system configured to receive a signal from the controller and indicate that one or more of the friction components is stuck in the engaged position.

As used herein, the "engaged position" refers to a position of the brake friction component in which the component is at least partially engaged with a complementary brake component to create friction between the components to stop and/or slow a tire of the vehicle. In various embodiments, for example, wherein the vehicle's braking system comprises a disc-braking system, the engaged position refers to a position of a brake caliper in which the caliper is at least partially engaged with a rotor to thereby create friction between the brake pads (i.e., carried by the caliper) and the rotor to stop and/or slow a tire of the vehicle. And, in various additional embodiments, wherein the vehicle's braking system comprises a drum-braking system, the engaged position refers to a position of the brake shoes in which the shoes are at least partially engaged with a drum to create friction between the shoes and the drum to stop and/or slow a tire of the vehicle. In other words, brake friction components, such as, for example, calipers and shoes may both engage and disengage their respective rotors and drums to slow and/or stop the vehicle's motion and allow the vehicle to increase speed and/or move again. And, a friction component may become stuck in the engaged position when it is no longer able to disengage the rotor or drum when the braking event is over.

Various exemplary embodiments of the present disclosure contemplate using various vehicle sensors to provide signals to the controller, and the controller then utilizes the signals to determine whether or not to generate a notification. The vehicle sensors may include existing vehicle sensors when available, such as, for example, tire pressure monitoring system (TPMS) sensors, steering wheel angle sensors, barometric pressure sensors, temperature sensors, and various additional engine sensors. In various additional embodiments, for example, the vehicle may include a relay control module (RCM) having 6 degrees of freedom (DOF) sensors that yield, for example, yaw, pitch, and roll. In such embodiments, the controller could utilize, for example, the yaw signal from the RCM to determine whether or not the vehicle is drifting and if the driver is compensating for this drift via the steering wheel input. Because most existing vehicles already contain the above sensors, certain embodiments of the present disclosure contemplate using only existing vehicle sensors. Embodiments of the present disclosure also contemplate systems and methods that include and utilize additional sensors as needed to provide the signal inputs used in the systems and methods of the present disclosure.

Figure 3:
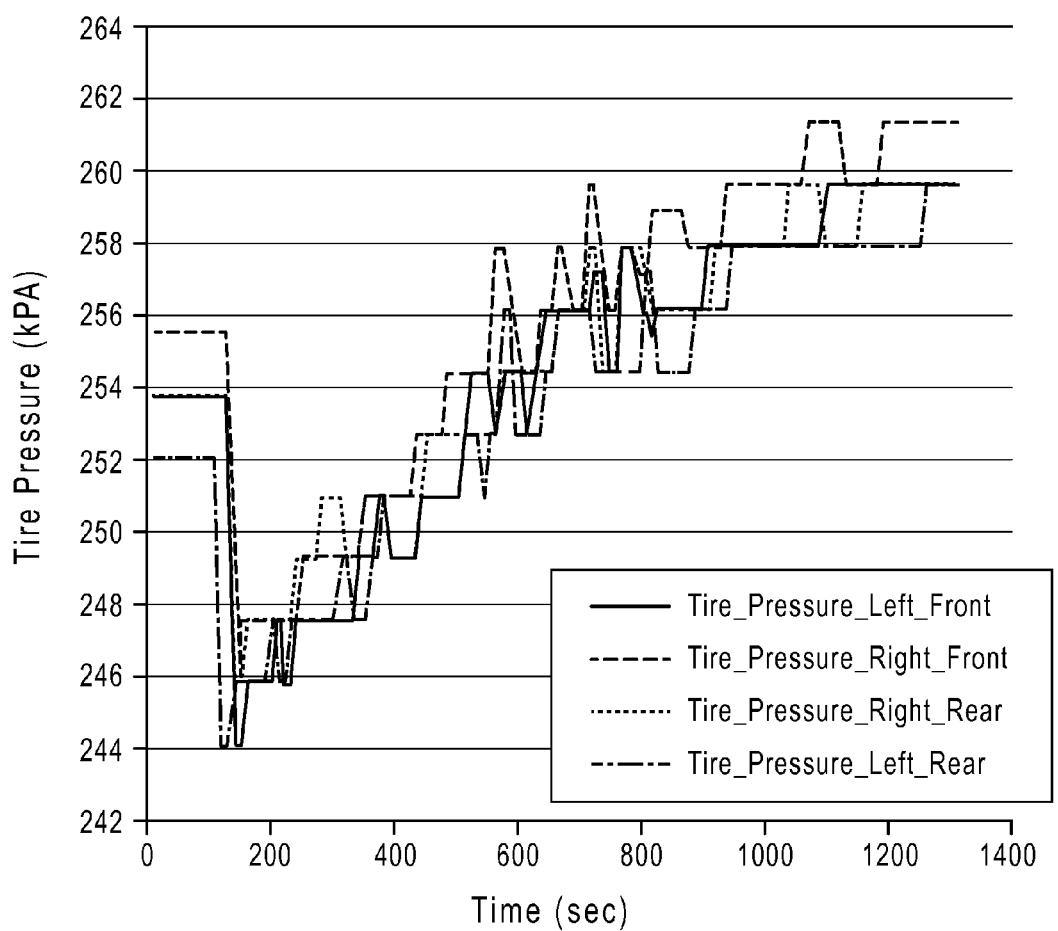
FIG. 3 is a graph illustrating tire pressure as a function of time for a vehicle with good calipers.
Figure 4:
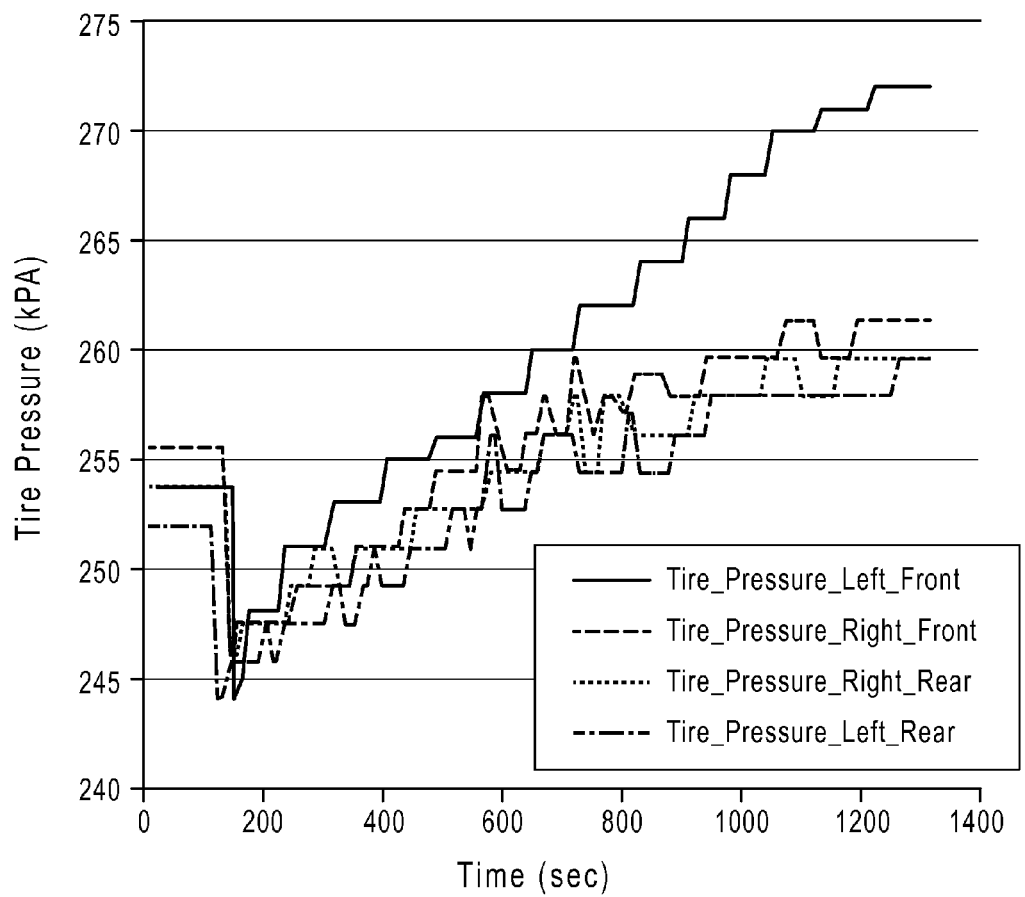
FIG. 4 is a graph illustrating tire pressure as a function of time for a vehicle with a stuck brake friction component.

To determine if one or more of the friction components of a vehicle is stuck in the engaged position, the systems and methods of the present disclosure contemplate, upon each new vehicle start-up (i.e., upon the initiation of each new drive cycle), calculating a pressure change of each tire (i.e., left front (LF), right front (RF), left rear (LR), and right rear (RR)) by comparing a stored tire pressure for each tire with the current tire pressure of each tire (i.e., as sensed by the TPMS). As would be understood by those of ordinary skill in the art, since the TPMS sensors exist inside a closed system, the ideal gas law applies. Accordingly, as the temperature of each tire increases, the internal pressure of each tire will also increase. The TMPS sensor pressure profile for each tire may, therefore, be used as a starting point to infer that a brake friction component is sticking. After a long soak, for example, when the vehicle has been off for at least 4 hours, the tires will cool down to ambient temperature. At the next vehicle start-up, the tire temperatures, and thus internal pressures of the tires, should therefore all be near or equal to each other. As illustrated in FIG. 3, for a vehicle with good brake friction components, upon vehicle start-up, the tire pressures will all increase uniformly (e.g., from road friction which causes the internal pressure of each tire to rise modestly) and then plateau. If, however, a brake friction component on one of the tires is stuck in the engaged position, it will heat up and transfer heat to the tire thereby causing an abnormal pressure profile for that tire. As illustrated in FIG. 4, for example, the pressure profile for the left, front tire is indicative of a possible stuck left, front brake friction component.

To help ensure that the TPMS sensor pressure profiles are not distorted by outside factors (which may otherwise indicate an abnormal pressure profile), in accordance with various exemplary embodiments, upon each new vehicle start-up and before the pressure change of each tire is calculated, various safeguards may also be employed. In various embodiments, for example, the systems and methods of the present disclosure may first determine if the vehicle has been off long enough to allow the components to reach ambient temperature (e.g., for at least about 4 hours), if the current drive cycle is long enough to allow the pressure profiles to increase (e.g., the drive cycle is greater than about 15 minutes), and if the resting tire pressure of each tire is within its recommended pressure range (e.g., as indicated by the vehicle manufacture).

If the above safeguards are met, the pressure change of each tire may then be calculated. In various embodiments, for example, a stored pressure change for each tire (which was sensed in the previous drive cycle) is compared to the newly sensed tire pressure of each tire from the current drive cycle to determine a pressure change of each tire between the drive cycles. The pressure change of each tire may then be compared with a threshold pressure change indicative of a possible stuck friction component. As would be understood by those of ordinary skill in the art, the threshold pressure change for each drive cycle may be dependent upon various environmental and/or vehicle factors including, but not limited to, the barometric pressure, ambient air temperature, and/or miles driven during the vehicle's current drive cycle. In accordance with various embodiments, the threshold pressure change may therefore take into account such factors, and be determined based on various sensor inputs, including, for example, a barometric pressure sensor, temperature sensor, and various engine sensors.

Upon comparison of the pressure changes, if the pressure change of any of the tires is greater than the threshold pressure change, the tire is flagged, for example, as having a suspected stuck brake friction component. To confirm that the pressure change is caused by a stuck brake friction component, and not possibly by something else, such as, for example, a bad bearing, the systems and methods of the present disclosure then consider the angle of the steering wheel (i.e., as sensed by the steering wheel angle sensor). In accordance with various embodiments, for example, for each flagged tire, the angle of the steering wheel is compared to a threshold value and a notification is generated if the angle of the steering wheel exceeds the threshold value for one or more of the flagged tires. In various embodiments, for example, the thresholds for steering wheel angle of a given tire may be:

for a front, left tire the threshold value is about 5 degrees in a clockwise direction;

for a front, right tire the threshold value is about 5 degrees in a counterclockwise direction;

for a rear, left tire the threshold value is about 2.5 degrees in the clockwise direction; and for a rear, right tire the threshold value is about 2.5 degrees in the counterclockwise direction.

Accordingly, if a steering angle of a flagged tire exceeds its threshold value, it may be have one or more stuck brake components.

Accordingly, the systems and methods of the present disclosure take both tire pressure and the angle of the steering wheel into account before making an inference that the vehicle has a stuck friction component. In other words, if the systems and methods of the present disclosure determine that one of the vehicle's tires has a pressure profile from vehicle start-up that rises dramatically, and the angle of the steering wheel indicates that the driver is demanding steer (which exceeds the threshold value) in an opposite direction from the suspect tire (thereby indicating that the driver is self-correcting to compensate for the stuck component), the systems and methods will infer that the tire has a stuck brake friction component and send a warning to the vehicle's driver regarding the stuck component.

Turning now to the drawings, FIG. 1 shows the structure of an exemplary embodiment of a system 100 for detecting a stuck brake friction component in accordance with the present disclosure. As illustrated in FIG. 1, a vehicle 110 may have tires (i.e., wheels) 120, 122, 124, and 126 with respective brake friction components 130, 132, 134, and 136, which are associated with the vehicle 110's braking system and which are configured to slow and/or stop each respective tire 120, 122, 124, and 126. In various embodiments, for example, wherein the vehicle 110 has a disc-braking system, the brake friction components include calipers/brake pads. And, in various additional exemplary embodiments, wherein the vehicle 110 has a drum-braking system, the brake friction components include brake shoes. Those of ordinary skill in the art will understand, however, that the present disclosure contemplates detecting stuck brake friction components on vehicles having various types and/or combinations of braking systems and is not intended to be limited to vehicles having a disc-braking system, a drum-braking system, or any combination thereof.

Front wheel 120 and friction component 130 are mounted on the left side of front axle 140 and front wheel 122 and friction component 132 are mounted on the right side of the front axle 140. Rear wheel 124 and friction component 134 are mounted on the left side of rear axle 142 and rear wheel 126 and friction component 136 are mounted on the right side of the rear axle 142. The system 100 includes a tire pressure monitoring system (TPMS) (shown by individually labeled TPMS sensors 150, 152, 154, and 156), a steering wheel angle sensor 116 (which measures a steering wheel angle 114 of a steering wheel 112), and at least one controller 160 that is configured to receive signals from the TPMS and the steering wheel angle sensor 116 to detect if one or more of the friction components 130, 132, 134, and 136 is stuck in an engaged position. The system 100 may further include a notification system 170 that is configured to receive a signal from the controller 160 and indicate to an observer, such as, for example, a driver of the vehicle 110 that one or more of the friction components 130, 132, 134, and 136 is stuck in the engaged position and therefore needs to be serviced.

In various embodiments, as illustrated in FIG. 1, the system 100 may include four TPMS sensors 150, 152, 154, and 156, wherein each TPMS sensor is associated with a respective tire 120, 122, 124, and 126 and friction component 130, 132, 134, and 136. As would be understood by those of ordinary skill in the art, each TPMS sensor 150, 152, 154, and 156 is mounted with respect to each tire 120, 122, 124, and 126 to continuously measure the internal pressure of each respective tire 120, 122, 124, and 126 while the vehicle 110 is driven. In this manner, the TPMS sensors 150, 152, 154, and 156 may measure a current tire pressure of each tire 120, 122, 124, and 126 of the vehicle 110.

Those of ordinary skill in the art would understand that the system 100 illustrated in FIG. 1 is exemplary only and intended to illustrate one embodiment of the present disclosure. Accordingly, systems for detecting stuck brake friction components in accordance with the present disclosure may have various types, numbers and/or configurations of tires, friction components, controllers, and/or sensors without departing from the scope of the present disclosure and claims.

In accordance with various embodiments of the present disclosure, upon each new vehicle start-up, the controller 160 may receive signals from the TPMS sensors 150, 152, 154 and 156 and the steering wheel angle sensor 116, and evaluate each of the friction components 130, 132, 134, and 136 based on the signals, as set forth in the following exemplary embodiments. As above, however, in various embodiments, before the system 100 evaluates the friction components, it may employ various safeguards to help ensure that the data used to make its evaluation is not obscured by outside factors. In various embodiments, for example, the controller 160 may first determine: (1) if the vehicle has been off for at least about 4 hours (i.e., long enough to allow the components to reach ambient temperature); (2) if the current drive cycle is greater than about 15 minutes (i.e., long enough to allow the pressure profiles of the tires to increase); and (3) if the resting tire pressure of each tire is within its recommended pressure range. The controller 160 may include, for example, an existing vehicle controller such as the Electronic Control Unit (ECU) of the vehicle 110, or a dedicated controller, or control may be distributed among more than one vehicle controller, as would be understood by one ordinarily skilled in the art.

In various exemplary embodiments, the controller 160 may receive signals corresponding to the current tire pressure of each tire 120, 122, 124, and 126 from the TPMS sensors 150, 152, 154, and 156 and the angle 114 of the steering wheel 112 from the steering wheel angle sensor 116. As above, the controller 160 may then calculate a pressure change of each tire 120, 122, 124, and 126 by comparing a stored pressure for each tire 120, 122, 124, and 126 with the current pressure of each tire 120, 122, 124, and 126 (i.e., as sensed by the TPMS sensors 150, 152, 154, and 156). In various embodiments, for example, a memory (not shown) associated with the controller 160 may store the pressure for each tire 120, 122, 124, and 126 from the previous drive-cycle run.

To make an initial inference as to whether or not any of the friction components 130, 132, 134, and 136 are stuck, the controller may first determine a threshold pressure change that is indicative of a stuck friction component and compare the pressure change of each tire 120, 122, 124, and 126 with the threshold pressure change. As above, in various embodiments, the threshold pressure change may be based on various environmental and/or vehicle factors, including, for example, barometric pressure, ambient air temperature, and miles driven during the vehicle 110's current drive cycle. In order to account for such factors, the controller 160 may be configured to determine the threshold pressure change after a set period of time, such as, for example, after about 600 seconds, or after about 800 seconds.

As would be understood by those of ordinary skill in the art, the threshold pressure change is dependent on the starting cold pressure of each tire (which varies from tire to tire and is written on the sidewall of the tire as the max pressure rating) and the driving length from start. Accordingly, for a tire that is rated at 35 psi with a pressure (psi) gain of about 5 psi from start (i.e., tires generally may gain around 5 psi of pressure during driving before stabilizing), the threshold pressure change (i.e., from cold start) would be about 20% to about 30% above the starting cold pressure, or about 7 psi to about 10.5 psi.

If the pressure change of any of the tires 120, 122, 124, and 126 is greater than the threshold pressure change, the controller 160 may flag the tire, for example, to indicate that the tire's pressure profile is abnormally high and that the tire may therefore have a friction component that is stuck in the engaged position. In various embodiments, for example, a memory (not shown) associated with the controller 160 may store a value that indicates that the pressure change for a tire is abnormally high. If the controller 160 does not flag any of the tires, the system 100 will infer that all of the friction components 130, 132, 134, and 136 are good and terminate its run until the next vehicle start-up.

The controller 160 may then compare the angle 114 of the steering wheel 112 (i.e., as sensed by the steering wheel angle sensor 116) to a threshold value for each flagged tire. As above, in accordance with various embodiments, each tire 120, 122, 124, and 126 may have a different threshold value depending on the position of the tire of the vehicle 110. For example, if the front, left tire 120 is flagged, the threshold value is about 5 degrees in a clockwise direction; if the front, right tire 122 is flagged, the threshold value is about 5 degrees in a counterclockwise direction; if the rear, left tire 124 is flagged, the threshold value is about 2.5 degrees in the clockwise direction; and if the rear, right tire 126 is flagged, the threshold value is about 2.5 degrees in the counterclockwise direction.

The controller 160 then generates a notification if the angle 114 of the steering wheel 112 exceeds the threshold value for one or more of the flagged tires. In various embodiments, for example, to ensure that the angle 114 is not caused by natural steering fluctuations around true center, or by the driver intentionally turning the steering wheel (i.e., to turn the vehicle 110 or navigate a curvy road), the controller 160 may generate the notification if the angle 114 of the steering wheel 112 persistently exceeds the threshold value, for example, for at least about 2 minutes.

In various exemplary embodiments of the present disclosure, the controller 160 sends a notification to a notification system 170 when the angle 114 of the steering wheel 112 exceeds the threshold value for one or more of the flagged tires, and the notification system 170 alerts a driver of the vehicle 110 that one or more of the friction components 130, 132, 134, and 136 may be stuck in an engaged position and therefore need servicing. The notification system 170 can, for example, audibly and/or visually indicate to the driver that one or more of the friction components 130, 132, 134, and 136 needs to be checked and/or serviced. As would be understood by those of ordinary skill in the art, the notification system 170 can include, for example, an indicator light or LCD that is displayed on the vehicle's console, rearview mirror, or other location noticeable to a driver. The indicator light or LCD can be, for example, constant or blinking, can be displayed only at startup or displayed continuously throughout the vehicle's use, and can be accompanied by a sound to further aid in alerting the driver to the friction component condition. The present disclosure further contemplates a notification system 170 that also or alternatively alerts a dealer or mechanic that one or more of the friction components need to be checked and/or serviced, such as, for example, by storing a diagnostic trouble code that is accessed at the time of service and/or by transmitting a trouble code to a dealer or mechanic prior to the time of service. With this information, the service provider can contact the vehicle's owner regarding the need for service, or suggest that the friction components be inspected the next time the vehicle is in for service. The notification system 170 can be, for example, wireless within the vehicle and/or between the vehicle and the service provider.

Figure 2A:
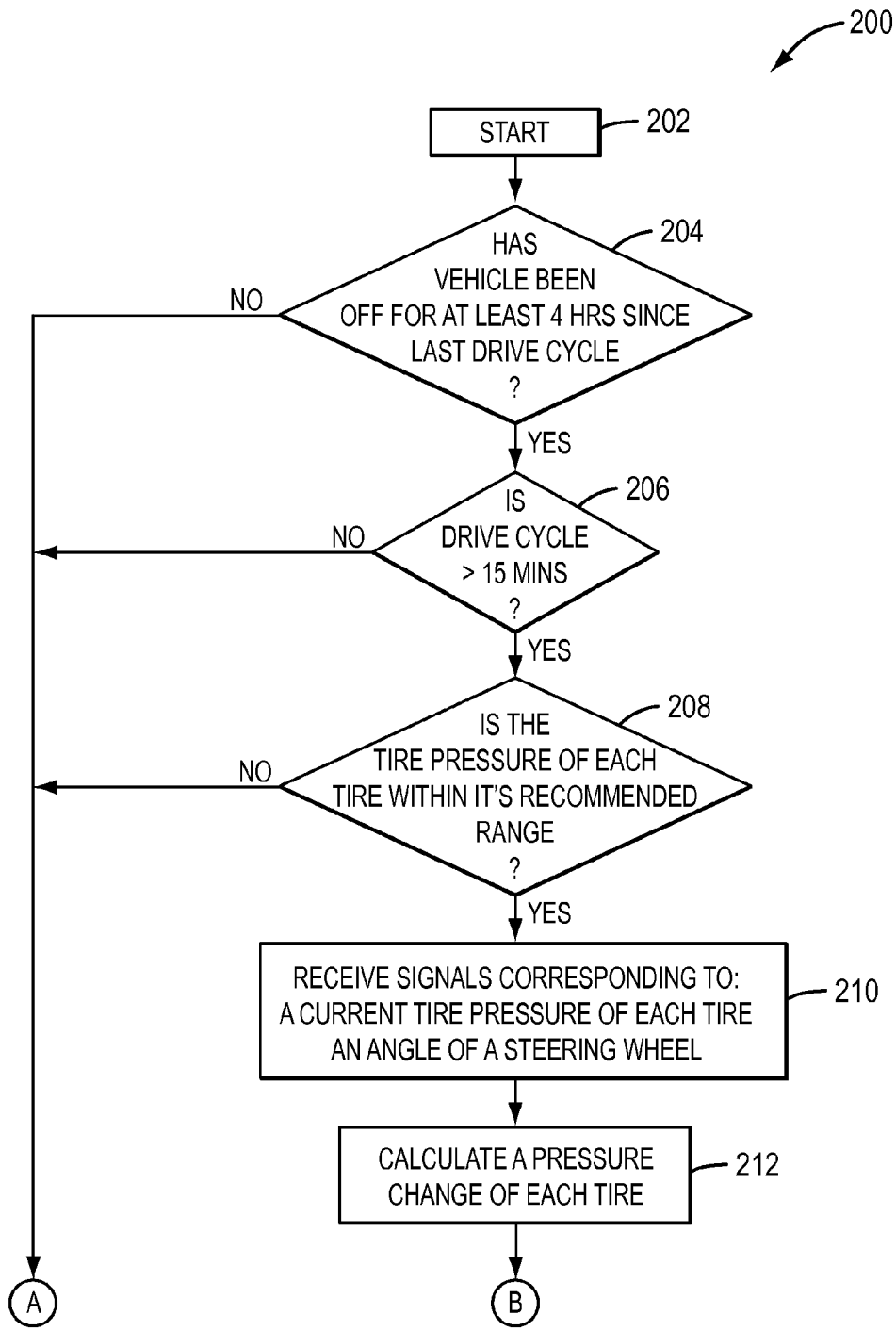
FIGS. 2A and 2B shows a flow chart illustrating an exemplary embodiment of a method for detecting a stuck brake friction component of a motor vehicle in accordance with the present disclosure.
Figure 2B:
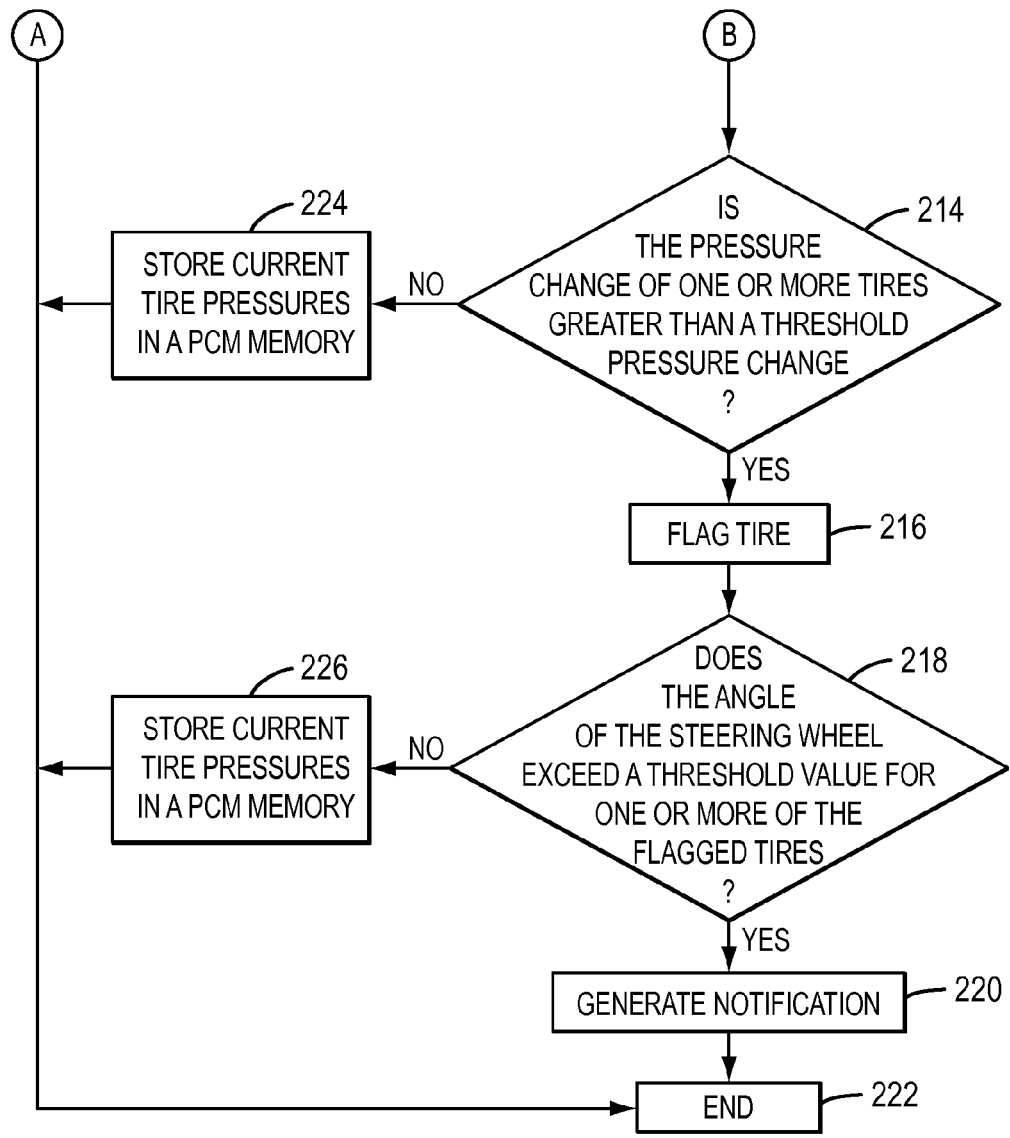

FIGS. 2A and 2B shows a flow diagram depicting an exemplary embodiment of a method 200 for detecting stuck brake friction components of a motor vehicle in accordance with the present disclosure. The method 200 begins, for example, when a vehicle, such as, for example, the vehicle 110 of FIG. 1, including the above described system 100, is started (see step 202); and ends (see step 222), for example, when the cycle terminates by: 1) determining that one of the established safeguards has not been met (see steps 204-208), 2) determining that all of the friction components are good (see steps 214-218), or 3) determining that one or more of the friction components is stuck thereby generating a notification (see step 220). The method will therefore run once upon each new start-up of the vehicle 110.

As illustrated in FIG. 2A, for example, at step 202, the cycle is started, and then at respective steps 204, 206, and 208 the controller 160 goes through the various safeguards to help ensure that the data used by the method 200 is not obscured by outside factors. At step 204, for example, the controller 160 may check to see if the vehicle has been off for at least about 4 hours (i.e., long enough to allow the components to reach ambient temperature) and if not terminate the cycle. At step 206, the controller 160 may check to see if the current drive cycle is greater than about 15 minutes (i.e., long enough to allow the pressure profiles of the tires to increase) and if not terminate the cycle. And, at step 208, the controller 160 may check to see if the resting tire pressure of each tire is within its recommended pressure range and if not terminate the cycle.

If each of the above safeguards is met, at step 210, the controller 160 then receives signals corresponding to a current tire pressure of at least one of the vehicles 110's tires, for example, each tire 120, 122, 124, and 126, and an angle 114 of a steering wheel 112. At step 212, the controller 160 calculates a pressure change of each tire 120, 122, 124, and 126 by comparing a stored tire pressure (i.e., from the previous cycle run of the method 200) for each tire 120, 122, 124, and 126 with the current tire pressure of each tire 120, 122, 124, and 126. And, at step 214, the controller 160 is able to make an initial inference regarding each friction component 130, 132, 134, and 136 of the vehicle 110 by comparing the pressure change of each tire 120, 122, 124, and 126 with a threshold pressure change, and flagging a tire if the pressure change of the tire is greater than the threshold pressure change at step 216. If the controller 160 does not flag any of the tires 120, 122, 124, and 126, the controller 160 infers that all of the friction components 130, 132, 134, and 136 are good and terminates the cycle until the next vehicle start-up, while, at step 224, storing the current tire pressures (e.g., in a memory) for use in the next cycle run.

Those of ordinary skill in the art would understand that the above order of steps 210-216 is exemplary only and that, in various additional embodiments, the controller 160 may receive the signals corresponding to the current tire pressure of each tire 120, 122, 124, and 126 and the angle 114 of the steering wheel 112 at different times. For example, in various embodiments the controller 160 may not receive the signal corresponding to the angle 114 of the steering wheel 112 until after one or more of the tires 120, 122, 124, and 126 is flagged (i.e., indicating a possible stuck friction component).

As above, the controller 160 may determine the threshold pressure change based on various environmental and/or vehicle factors, and may further wait for an established period of time to elapse before determining the threshold pressure change, such, as for example, about 600 seconds to about 800 seconds. In accordance with various embodiments, for example, as above, for a tire that is rated at 35 psi with a pressure (psi) gain of about 5 psi from start, the threshold pressure change (i.e., from cold start) would be about 20% to about 30% above the starting cold pressure, or about 7 psi to about 10.5 psi.

If one or more of the tires 120, 122, 124, and 126 is flagged, at step 218, the controller 160 will also check the angle 114 of the steering wheel 112, for example, by comparing the angle 114 of the steering wheel 112 with a threshold value for each of the flagged tires. If the angle 114 of the steering wheel 112 exceeds the threshold value for one or more of the flagged tires, the controller 160 generates a notification at step 220. In various embodiments, for example, the controller 160 may provide a warning to a driver of the vehicle 110 that one or more of the vehicle 110's friction components is stuck in an engaged position. For example, if the front, left tire 120 is flagged and the angle 114 of the steering wheel 112 exceeds about 5 degrees in a clockwise direction, the controller 160 may provide a warning that the front, left friction component 130 is stuck. If the front, right tire 122 is flagged and the angle 114 of the steering wheel 112 exceeds about 5 degrees in a counterclockwise direction, the controller 160 may provide a warning that a front, left friction component 132 is stuck. If the rear, left tire 124 is flagged and the angle 114 of the steering wheel 112 exceeds about 2.5 degrees in the clockwise direction, the controller 160 may provide a warning that a rear, left friction component 134 is stuck. And, if the rear, right tire 126 is flagged and the angle 114 of the steering wheel 112 exceeds about 2.5 degrees in the counterclockwise direction, the controller 160 may provide a warning that a rear, right friction component 136 is stuck.

If the controller 160 determines that the angle 114 of the steering wheel 112 does not exceed the threshold value for any of the flagged tires, the controller 160 may infer that all of the friction components 130, 132, 134, and 136 are good and terminate the cycle until the next vehicle start-up, while, at step 226, storing the current tire pressures (e.g., in a memory) for use in the next cycle run.

As above, the controller 160 may include, for example, an existing vehicle controller such as the Electronic Control Unit (ECU) of the vehicle 110, or a dedicated controller, or control may be distributed among more than one vehicle controller, as would be understood by one ordinarily skilled in the art. The controller 160 is programmed to run an algorithm to detect a stuck brake friction component based, for example, on the flow chart of FIGS. 2A and 2B.

Furthermore, the method described above can be performed in one or more devices of the vehicle. For example, the method can be performed by a control device for the detection system 100, such as a central control unit or controller. The control device can be implemented within any element of the system 100 such as a control unit. Alternatively, the control device can be a separate device from any of the above-described system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied in a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Accordingly, while the present disclosure has been disclosed in terms of using a detection system, with a single controller, the disclosure as disclosed works equally well for various quantities and types of controllers and/or microprocessors. Furthermore, while the present disclosure has generally been disclosed as being used to monitor each of a vehicle's tires (e.g., all four tires of the vehicle 110), various embodiments of the present disclosure further contemplate monitoring at least one of the vehicle's tires (e.g., just one or two of the vehicle's tires). Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present disclosure. It is to be understood that the various embodiments shown and described herein are to be taken as exemplary. Elements and materials, and arrangements of those elements and materials, may be substituted for those illustrated and described herein, parts and processes may be reversed, and certain features of the present disclosure may be utilized independently, all as would be apparent to one skilled in the art after having the benefit of the description herein. Changes may be made in the elements described herein without departing from the spirit and scope of the present disclosure and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

What is claimed is:

1. A system for detecting a brake friction component that has not disengaged from a complimentary brake friction component, comprising:
   a tire pressure monitoring system;
   a steering wheel angle sensor; and
   a controller configured to determine whether a friction component remains in an engaged position after completion of a braking event based on a vehicle tire pressure change and a steering wheel angle and to generate a notification when the friction component remains engaged.

2. The system of claim 1, wherein the controller is configured to receive signals corresponding to a current tire pressure of each tire of a vehicle from the tire pressure monitoring system and the steering wheel angle from the steering wheel angle sensor.

3. The system of claim 2, wherein the controller is configured to calculate a pressure change of each tire by comparing a stored tire pressure of each tire with the current tire pressure of each tire.

4. The system of claim 3, wherein the controller is configured to determine a threshold pressure change indicative of a friction component that has not disengaged from a complimentary brake friction component based on barometric pressure, ambient air temperature, and miles driven during the vehicle's current drive cycle.

5. The system of claim 4, wherein the threshold pressure change is about 20% to about 30% above a starting cold pressure for each tire.

6. The system of claim 4, wherein the controller is configured to determine the threshold pressure change after a time period of about 600 seconds to about 800 seconds from vehicle startup.

7. The system of claim 4, wherein the controller is configured to compare the pressure change of each tire with the threshold pressure change.

8. The system of claim 7, wherein the controller is configured to flag a tire if the pressure change of the tire is greater than the threshold pressure change.

9. The system of claim 8, wherein the controller is configured to compare the steering wheel angle to a threshold value for each flagged tire.

10. The system of claim 9, wherein, if the flagged tire is a front tire, the threshold value is about 5 degrees.

11. The system of claim 9, wherein, if the flagged tire is a rear tire, the threshold value is about 2.5 degrees.

12. The system of claim 9, wherein the controller is configured to generate the notification if the steering wheel angle exceeds the threshold value for one or more of the flagged tires.

13. The system of claim 12, wherein the controller is configured to generate the notification if the steering wheel angle exceeds the threshold value for at least about 2 minutes.

14. The system of claim 1, wherein the vehicle's braking system comprises a disc-braking system, and wherein the controller is configured to generate the notification if the controller determines that one or more calipers of the disc-braking system remains in an engaged position with a rotor of the disc-braking system.

15. The system of claim 1, wherein the vehicle's braking system comprises a drum-braking system, and wherein the controller is configured to generate the notification if the controller determines that one or more brake shoes of the drum-braking system remains in an engaged position with a drum of the drum-braking system.

16. The system of claim 1, further comprising a notification system configured to receive a signal from the controller and indicate that one or more of the friction components remains in the engaged position.

17. A method for detecting a brake friction component that has not disengaged from a complimentary brake friction component, comprising:
   receiving signals corresponding to a current tire pressure of at least one tire of a vehicle and an angle of a steering wheel of the vehicle;
   calculating a pressure change of the at least one tire;
   comparing the pressure change of the at least one tire with a threshold pressure change;
   flagging a tire if the pressure change of the tire is greater than the threshold pressure change; and generating a notification if the angle of the steering wheel exceeds a threshold value for one or more of the flagged tires.

18. The method of claim 17, wherein calculating the pressure change of the at least one tire comprises comparing a stored tire pressure for the at least one tire with the current tire pressure of the at least one tire.

19. The method of claim 17, wherein generating the notification comprises providing a warning to the vehicle's driver that one or more of the vehicle's friction components remains in an engaged position.

20. The system of claim 19, wherein providing the warning comprises providing a warning that a front, right brake friction component remains in the engaged position if a front, right tire is flagged and the angle of the steering wheel exceeds about 5 degrees in a counterclockwise direction.

21. The system of claim 19, wherein providing the warning comprises providing a warning that a front, left brake friction component remains in the engaged position if a front, left tire is flagged and the angle of the steering wheel exceeds about 5 degrees in a clockwise direction.

22. The system of claim 19, wherein providing the warning comprises providing a warning that a rear, right brake friction component remains in the engaged position if a rear, right tire is flagged and the angle of the steering wheel exceeds about 2.5 degrees in a counterclockwise direction.

23. The system of claim 19, wherein providing the warning comprises providing a warning that a rear, left brake friction component remains in the engaged position if a rear, left tire is flagged and the angle of the steering wheel exceeds about 2.5 degrees in a clockwise direction.

24. A method for detecting a brake friction component that has not disengaged from a complimentary brake friction component, comprising:
receiving signals corresponding to current vehicle tire pressure from a tire pressure monitoring system and steering wheel angle from a steering wheel angle sensor;
determining whether a brake friction component remains in an engaged position after completion of a braking event based on the signals; and
generating a notification when the friction component remains engaged.

* * * * *